(12) United States Patent
Gormley

(10) Patent No.: US 10,895,220 B2
(45) Date of Patent: Jan. 19, 2021

(54) HIDDEN LINK SYSTEM BLOCKER DOOR

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 58 days.

(21) Appl. No.: 16/130,759

(22) Filed: Sep. 13, 2018

(65) Prior Publication Data

US 2020/0088134 A1  Mar. 19, 2020

(51) Int. Cl.
*F02K 1/76* (2006.01)
*F02K 1/72* (2006.01)

(52) U.S. Cl.
CPC ............ *F02K 1/763* (2013.01); *F02K 1/72* (2013.01); *F05D 2260/53* (2013.01)

(58) Field of Classification Search
CPC ... F02K 1/70; F02K 1/72; F02K 1/763; F02K 1/62; F02K 1/625
See application file for complete search history.

(56) References Cited

U.S. PATENT DOCUMENTS

| | | | | |
|---|---|---|---|---|
| 3,612,209 A | * | 10/1971 | Vdoviak | F02K 1/62 60/232 |
| 3,612,401 A | * | 10/1971 | Ellis | F02K 1/70 239/265.29 |
| 9,127,623 B2 | | 9/2015 | Peyron | |
| 9,739,235 B2 | | 8/2017 | Gromley | |
| 9,938,929 B2 | | 4/2018 | Gormley | |
| 10,006,405 B2 | | 6/2018 | Stuart et al. | |
| 2015/0176528 A1 | * | 6/2015 | Peyron | F02K 1/72 239/265.19 |
| 2016/0245229 A1 | * | 8/2016 | Peyron | F02K 1/625 |
| 2018/0106216 A1 | | 4/2018 | Jolivet et al. | |

FOREIGN PATENT DOCUMENTS

| | | |
|---|---|---|
| EP | 3018327 | 5/2016 |
| EP | 3018329 | 5/2016 |

OTHER PUBLICATIONS

European Patent Office, European Search Report dated Aug. 11, 2020 in Application No. 19190622.1.

* cited by examiner

*Primary Examiner* — Andrew H Nguyen
(74) *Attorney, Agent, or Firm* — Snell & Wilmer LLP

(57) ABSTRACT

A system for deploying a blocker door of a nacelle includes a master link configured to be coupled to a fixed structure of the nacelle and a master crank pivotally attached to the master link. The system further includes a first door crank and a first door link pivotally coupled to the first door crank. The system further includes a first blocker door coupled to the first door link and a first driveshaft coupled to the master crank and to the first door crank and configured to transfer motion from the master crank to the first door crank such that aft translation of a translating sleeve of the nacelle drives the master crank via the master link, which drives the first door link via the first driveshaft and the first door crank to move the first blocker door into a bypass air duct defined by the nacelle.

17 Claims, 9 Drawing Sheets

HIDDEN LINK SYSTEM BLOCKER DOOR

FIELD

The present disclosure relates to thrust reversers for aircraft propulsion systems and, more particularly, to systems for deploying blocker doors of thrust reversers.

BACKGROUND

Gas turbine engine systems for modern aircraft often include a thrust reverser incorporated into a nacelle. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. Conventional blocker doors are driven by drag links that are located in a bypass air duct of the nacelle. The drag links and corresponding fittings undesirably result in drag and may generate undesirable noise because of their location in the bypass air duct.

SUMMARY

Disclosed herein is a system for deploying a blocker door of a nacelle. The system includes a master link configured to be coupled to a fixed structure of the nacelle. The system further includes a master crank pivotally attached to the master link. The system further includes a first door crank. The system further includes a first door link pivotally coupled to the first door crank. The system further includes a first blocker door coupled to the first door link. The system further includes a first driveshaft coupled to the master crank and to the first door crank and configured to transfer motion from the master crank to the first door crank such that translation of a translating sleeve of the nacelle in an aft direction drives the master crank via the master link, which in turn drives the first door link via the first driveshaft and the first door crank to move the first blocker door into a bypass air duct defined by the nacelle.

In any of the foregoing embodiments, the master crank and the first door crank are each configured to be pivotally coupled to the translating sleeve.

Any of the foregoing embodiments may further include a second door crank; a second door link pivotally coupled to the second door crank; a second blocker door coupled to the second door link; and a second driveshaft coupled to the master crank and to the second door crank and configured to transfer motion from the master crank to the second door crank.

In any of the foregoing embodiments, the master crank is located circumferentially between the first driveshaft and the second driveshaft.

In any of the foregoing embodiments, the master link, the master crank, the first door crank, and the first door link are each configured to be located radially outward from the bypass air duct in response to the translating sleeve being located at its forward-most position.

In any of the foregoing embodiments, the master link, the master crank, the first door crank, and the first door link are each configured to avoid contact with an aft cascade ring of a fixed cascade in response to aft and forward motion of the translating sleeve.

In any of the foregoing embodiments, the master link is pivotally attached to the fixed structure of the nacelle.

Any of the foregoing embodiments may further include a first hinge coupled to the first blocker door and configured to be coupled to the translating sleeve such that the first blocker door can pivot radially inward relative to the translating sleeve.

In any of the foregoing embodiments, the nacelle includes a translating cascade.

Also disclosed is a system for deploying a blocker door of a nacelle. The system includes a gear box configured to be coupled to a translating sleeve of the nacelle and to convert linear motion of the translating sleeve to rotational motion. The system further includes a first door crank. The system further includes a first door link pivotally attached to the first door crank. The system further includes a first blocker door coupled to the first door link. The system further includes a first driveshaft coupled to the gear box and to the first door crank and configured to transfer the rotational motion from the gear box to the first door crank, such that translation of the translating sleeve in an aft direction drives the first door link via the first door crank to move the first blocker door into a bypass air duct defined by the nacelle.

In any of the foregoing embodiments, the gear box, the first door crank, and the first door link are each configured to be located radially outward from the bypass air duct in response to the translating sleeve being located at its forward-most position.

In any of the foregoing embodiments, the nacelle includes at least one of a translating cascade or a fixed cascade.

Also disclosed is a system for deploying a blocker door of a nacelle. The system includes a master link configured to be coupled to a fixed structure of the nacelle. The system further includes a master crank pivotally attached to the master link. The system further includes a first door crank and a second door crank. The system further includes a first door link pivotally coupled to the first door crank and a second door link pivotally coupled to the second door crank. The system further includes a first blocker door coupled to the first door link and a second blocker door coupled to the second door link. The system further includes a first driveshaft coupled to the master crank and to the first door crank and a second driveshaft coupled to the master crank and to the second door crank, the first driveshaft and the second driveshaft being configured to transfer motion from the master crank to the first door crank and the second door crank, respectively, such that translation of a translating sleeve of the nacelle in an aft direction drives the master crank via the master link, which in turn drives the first door link via the first driveshaft and the first door crank and drives the second door link via the second driveshaft and the second door crank to move the first blocker door and the second blocker door into a bypass air duct defined by the nacelle.

In any of the foregoing embodiments, the master crank, the first door crank, and the second door crank are each configured to be pivotally coupled to the translating sleeve.

In any of the foregoing embodiments, the master crank is located circumferentially between the first driveshaft and the second driveshaft.

In any of the foregoing embodiments, the master link, the master crank, the first door crank, the first door link, the second door crank, and the second door link are each configured to be located radially outward from the bypass air duct in response to the translating sleeve being located at its forward-most position.

In any of the foregoing embodiments, the master link, the master crank, the first door crank, the first door link, the second door crank, and the second door link are each configured to avoid contact with an aft cascade ring of a fixed cascade in response to aft and forward motion of the translating sleeve.

In any of the foregoing embodiments, the master link is pivotally attached to the fixed structure of the nacelle.

Any of the foregoing embodiments may further include a first hinge coupled to the first blocker door and configured to be coupled to the translating sleeve such that the first blocker door can pivot radially inward relative to the translating sleeve.

In any of the foregoing embodiments, the nacelle includes a translating cascade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
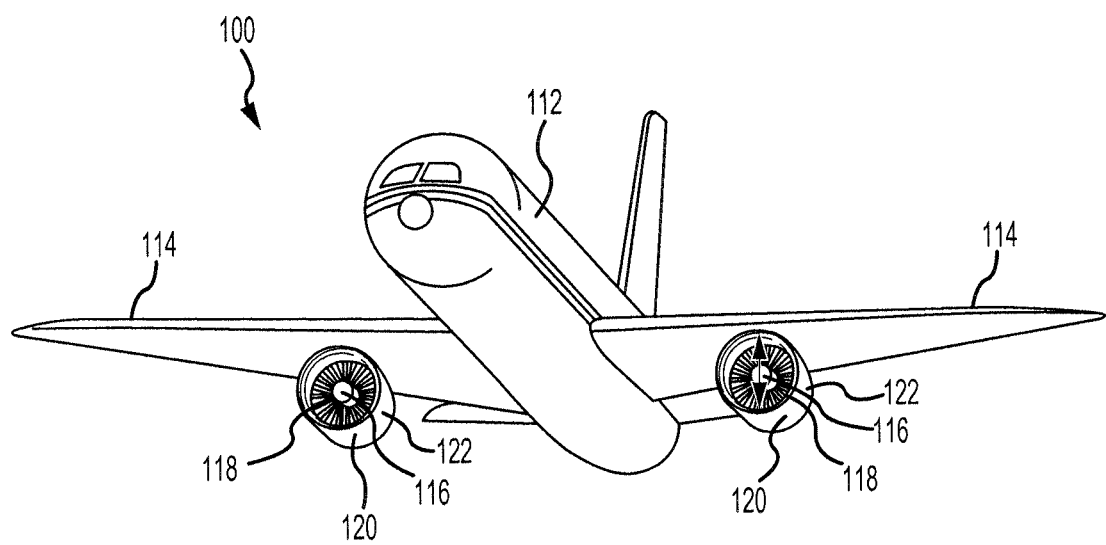
FIG. 1 illustrates a perspective view of an aircraft in accordance with various embodiments.

In various embodiments and with reference to FIG. 1, an aircraft 100 may include a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for the aircraft 100.

In various embodiments, the propulsion system 120 may include an engine having a fan 118 and an engine core 116 housed within a nacelle assembly 122. The nacelle assembly 122 may include an inlet, a fan cowl, a thrust reverser, and an exhaust system. The nacelle assembly 122 surrounds the engine core 116 providing smooth aerodynamic surfaces for airflow around and into the engine. The nacelle also helps define a bypass air duct through the propulsion system 120.

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system aft of the engine for thrust.

Figure 2:
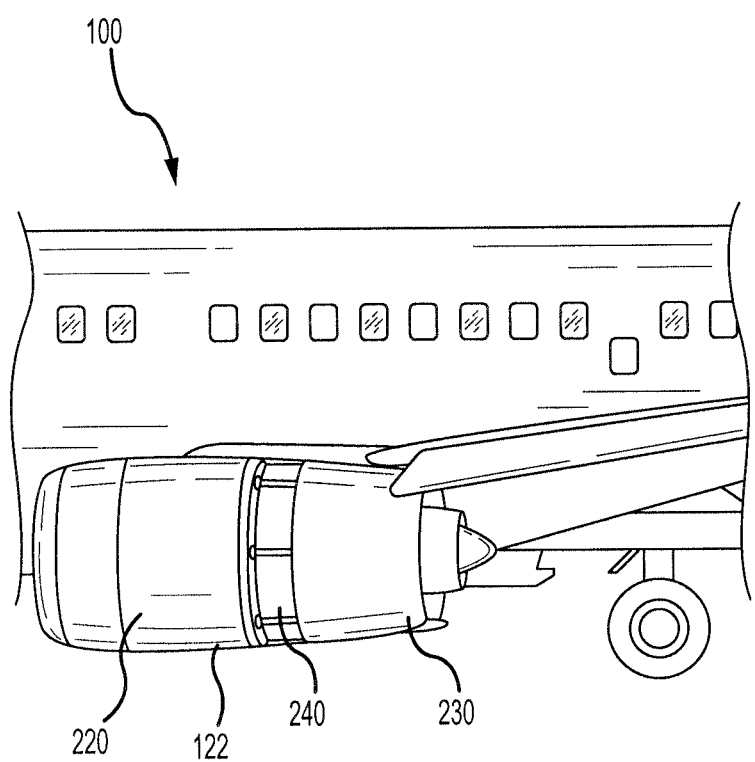
FIG. 2 illustrates a side view of the aircraft of FIG. 1 including a nacelle in accordance with various embodiments.

In various embodiments and with reference to FIG. 2, a thrust reverser system of the aircraft 100 may be included in the nacelle assembly 122 and may include a translating sleeve 230 and a cascade, or cascade array, 240. The thrust reverser system may also include an air diversion system that is designed to direct airflow in the bypass duct through the cascade to create reverse thrust. The air diversion system may be any suitable system including, for example, blocker doors, diversion doors, and/or the like.

Figure 3:
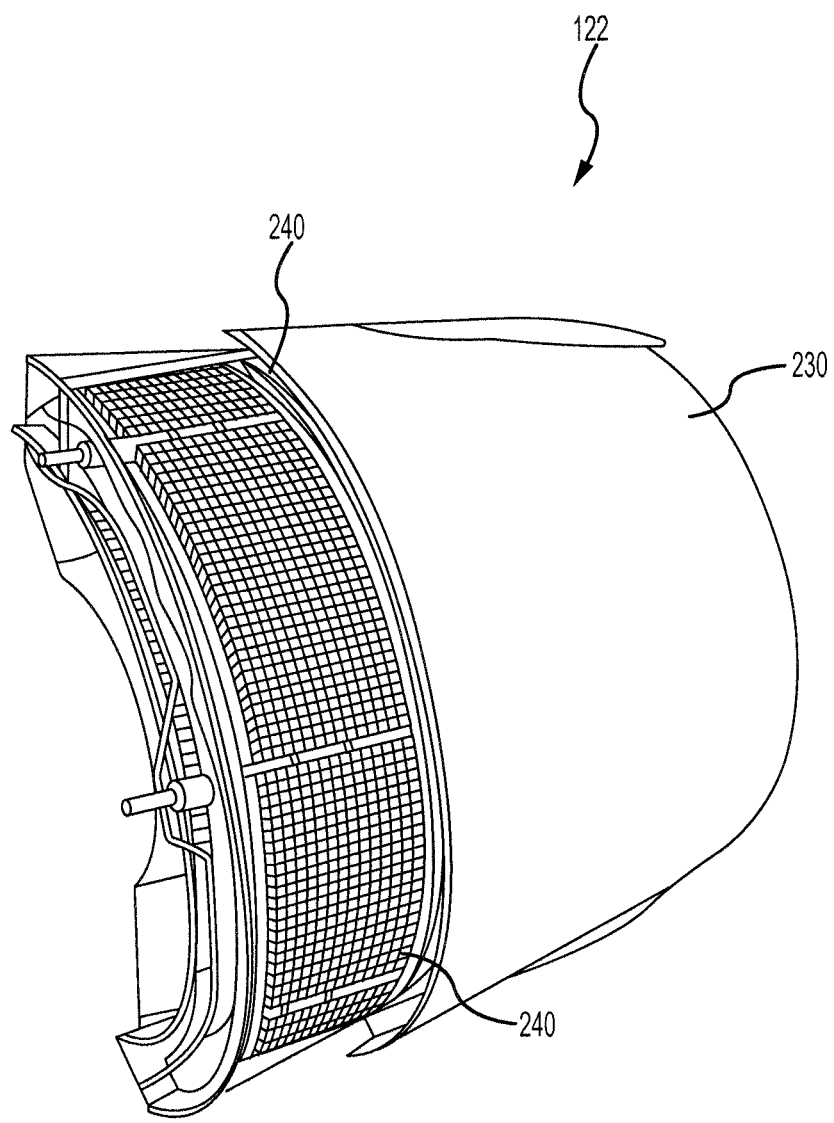
FIG. 3 illustrates a perspective view of a portion of the nacelle of FIG. 2 including a cascade array in accordance with various embodiments.

Referring to FIG. 3 and in operation, the translating sleeve 230 may translate and/or move aft, separating from a fan cowl 220 in response to an event (e.g., a landing, touch down, activation of the thrust reverser system manually or automatically, or the like). This aft movement of the translating sleeve 230 may expose the cascade 240 to allow air to be diverted through the cascade 240 and directed forward to create reverse thrust. As is known in this art, in the stowed position of the thrust reverser, the cascade 240 may be housed between an inner and an outer panel of the translating sleeve 230 which define a generally annular-shaped pocket therebetween.

Figure 5:
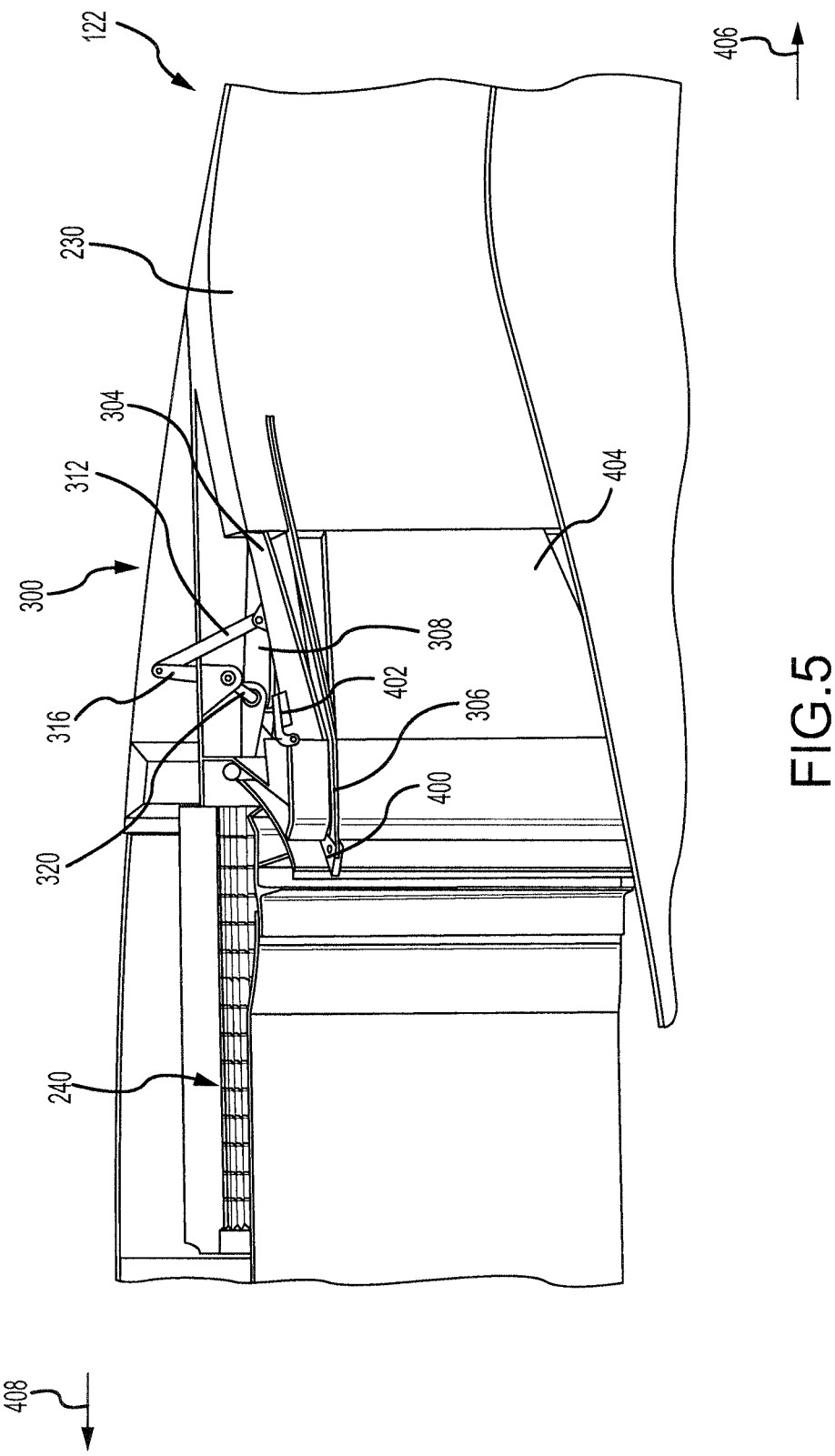
FIG. 5 illustrates the system of FIG. 4 implemented in the nacelle of FIG. 2 with the blocker doors fully stowed in accordance with various embodiments.
Figure 6:
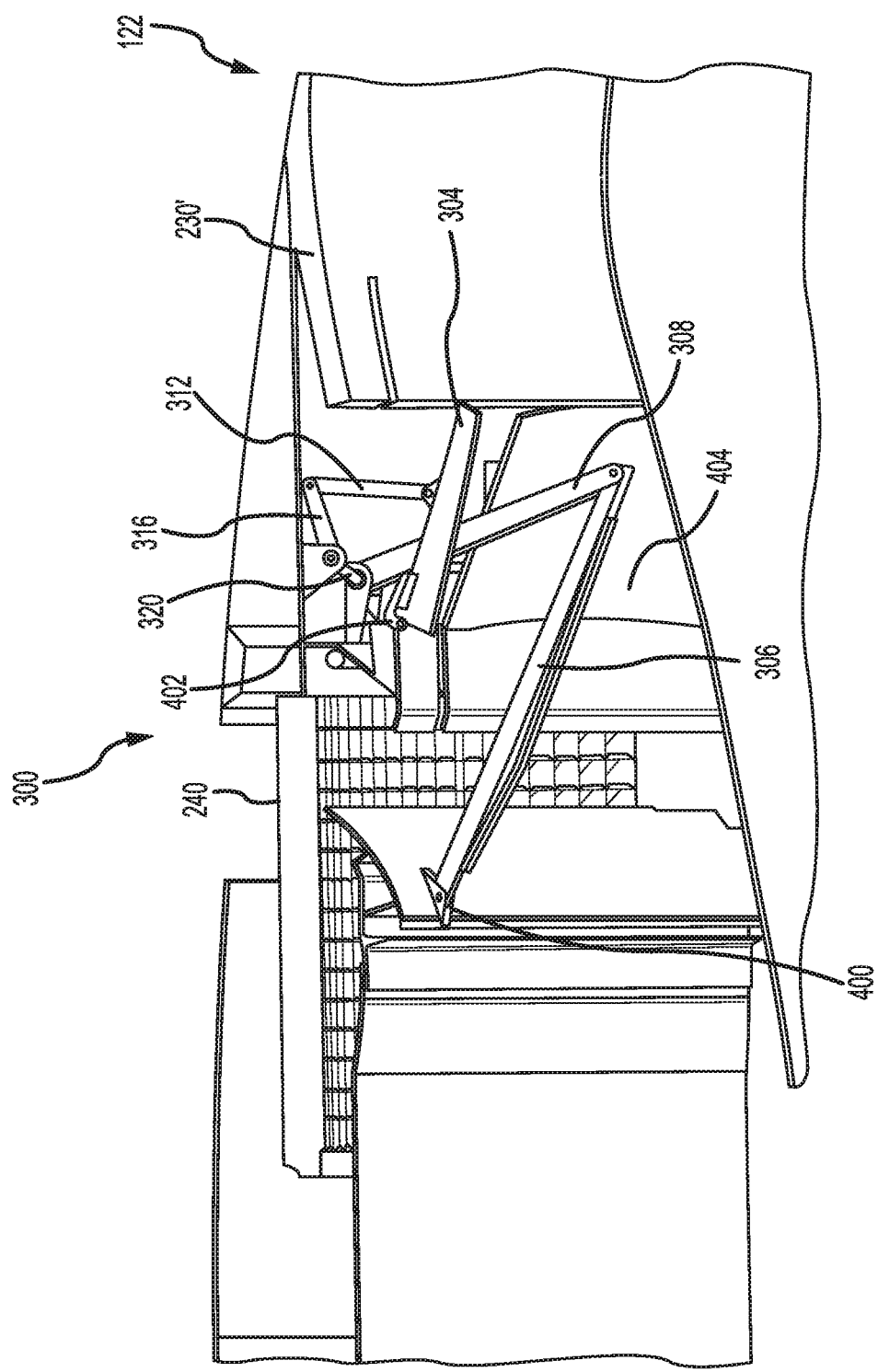
FIG. 6 illustrates the system of FIG. 5 with the blocker doors partially deployed in accordance with various embodiments.
Figure 7:
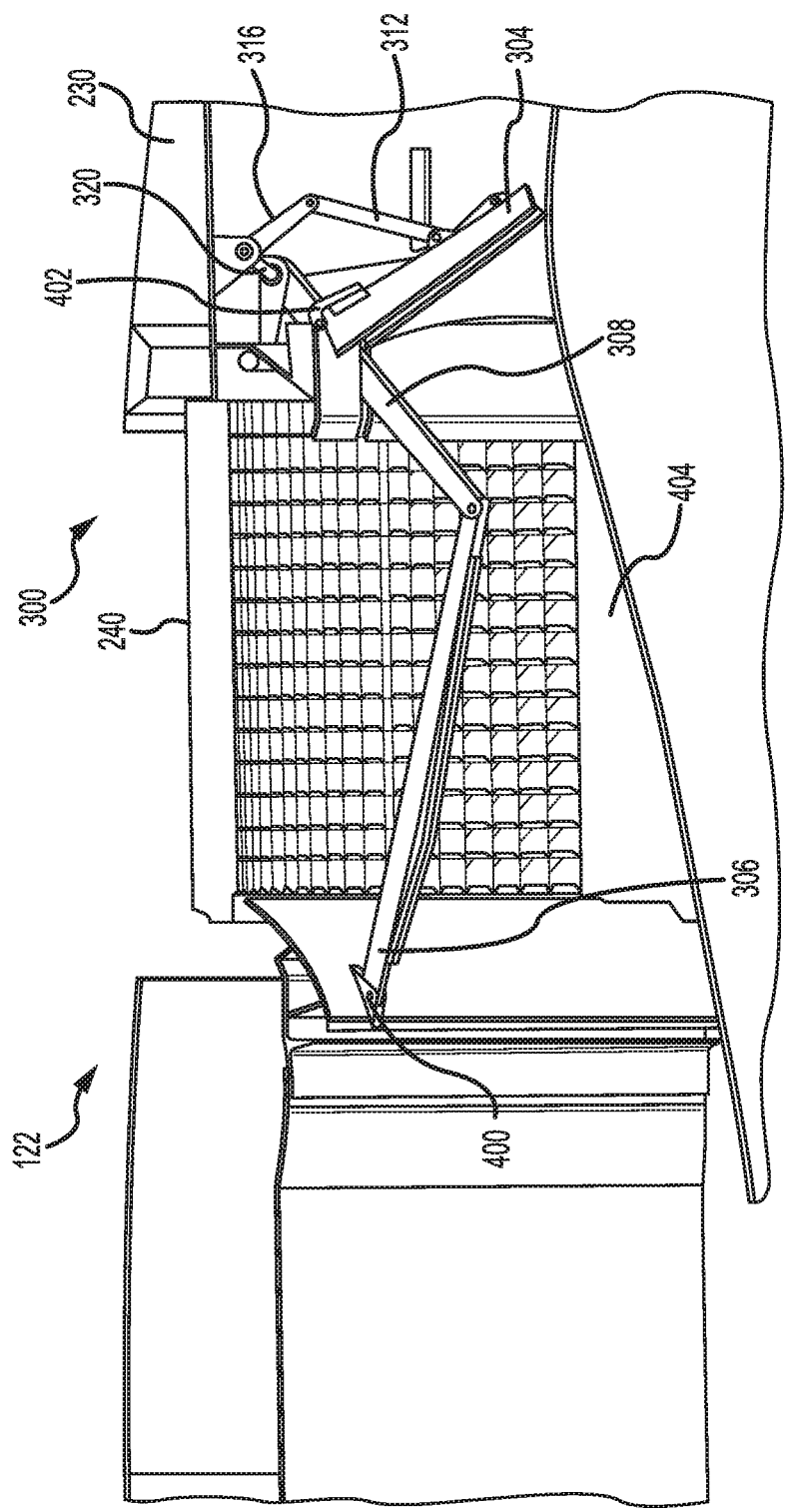
FIG. 7 illustrates the system of FIG. 5 with the blocker doors fully deployed in accordance with various embodiments.

Referring now to FIGS. 4 through 7, a system 300 may be included within the nacelle assembly for deploying blocker doors 302, 304 into a bypass air duct 404 defined by the nacelle assembly 122. In particular, the system 300 may include a first blocker door 302 and a second blocker door 304. The system 300 may include any quantity of blocker doors 302, 304 which may be oriented circumferentially about a centerline of the nacelle assembly. The blocker doors 302, 304 may be deployed into the bypass air duct 404 in order to divert bypass air through the cascade array 240. In particular, aft movement of the translating sleeve 230 may cause the blocker doors 302, 304 to become fully deployed (as shown in FIG. 7) in order to divert the bypass air through the cascade array 240.

The system 300 may further include a master link 306. The master link 306 may be coupled to a fixed structure 400 of the nacelle assembly. For example, the master link 306 may be pivotally coupled to the fixed structure 400 (such as a fixed structure coupled to the fan cowl 220 of FIG. 3 which may not translate with the translating sleeve 230). In various embodiments, the master link 306 may be coupled to a bull nose of the nacelle assembly.

The system 300 may further include a master crank 308. The master crank 308 may be pivotally coupled to the master link 306. For example, the master crank 308 may be coupled to an opposite end of the master link 306 from the fixed structure 400. An opposite end of the master crank 308 from the master link 306 may further be pivotally coupled to the translating sleeve 230.

The system 300 may further include a first door link 310 coupled to the first blocker door 302 and a second door link 312 coupled to the second blocker door 304. For example, the first door link 310 and the second door link 312 may be pivotally coupled to the first blocker door 302 and the second blocker door 304, respectively.

The system 300 may further include a first door crank 314 and a second door crank 316 coupled to the first door link 310 and the second door link 312, respectively. For example, the first door crank 314 and the second door crank 316 may be pivotally coupled to an opposite end of the first door link 310 and the second door link 312 from the blocker doors 302, 304.

The system 300 may further include a first driveshaft 318 and a second driveshaft 320. The first driveshaft 318 may be coupled between the master crank 308 and the first door crank 314. The second driveshaft 320 may be coupled between the master crank 308 and the second door crank 316.

The blocker doors 302, 304 may be pivotally coupled to the translating sleeve 230. For example, a hinge 402 may be coupled to the translating sleeve 230 and the second blocker door 304 and may facilitate hinging or pivoting of the second blocker door 304 relative to the translating sleeve 230. In that regard, translation of the translating sleeve 230 in an aft direction (shown by an arrow 406) may cause the blocker doors 302, 304 to deploy into the bypass air duct 404.

In particular, aft translation of the translating sleeve 230 drives extension of the master crank 308 and the master link 306 relative to each other. This extension of the master crank 308 is driven to the blocker doors 302, 304 via the driveshafts 318, 320, the door crank 314, 316, and the door links 310, 312. This driving of the door links 310, 312 causes the blocker doors 302, 304 to become fully deployed (as shown in FIG. 7).

In response to translation of the translating sleeve 230 in a forward direction (as shown by an arrow 408), the above process is reversed, causing the blocker doors 302, 304 to return to the stowed position. FIG. 5 illustrates the blocker doors 302, 304 fully stowed, FIG. 7 illustrates the blocker doors 302, 304 fully deployed, and FIG. 6 illustrates the blocker doors 302, 304 partially deployed. The cascade array 240 may be a translating cascade array 240, meaning that it translates in response to translation of the translating sleeve 230.

As shown in FIG. 5, the master link 306, the master crank 308, the door links 310, 312, and the door crank 314, 316 are located radially outward of the blocker doors 302, 304 in response to the blocker doors 302, 304 being fully stowed (i.e., in response to the translating sleeve 230 being in its forward-most location). This provides the advantage of reduced drag in the bypass air duct 404 during operation of the corresponding gas turbine engine relative to conventional blocker door deployment systems which may include a drag link and drag link fitting in the bypass air duct. The location of the master link 306, the master crank 308, the door links 310, 312, and the door crank 314, 316 radially outward from stowed blocker doors 302, 304 may further advantageously reduce noise which may be caused by bypass air flowing over drag links and drag link fittings of conventional blocker door deployment systems.

Additionally, use of the master link 306 and master crank 308 to drive the door cranks 314, 316 and the door links 310, 312 slows deployment of the blocker doors 302, 304 relative to conventional blocker door deployment systems. This provides for increased area match of airflow through the cascade array 240 and an exhaust system of the propulsion system, reducing the likelihood of damage to a corresponding gas turbine engine.

Figure 8:
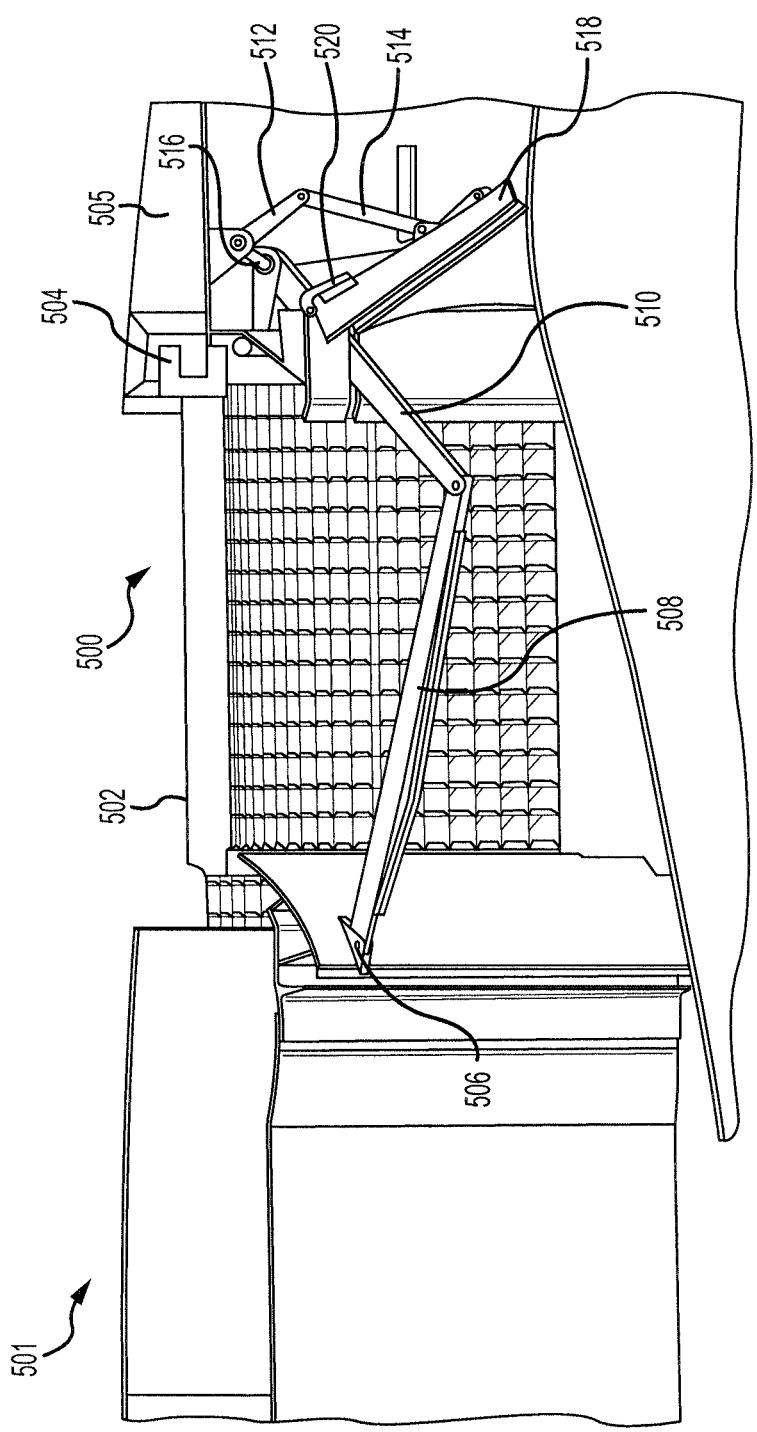
FIG. 8 illustrates a system for deploying blocker doors used in a nacelle having a fixed cascade array in accordance with various embodiments.

Referring now to FIG. 8, another blocker door deployment system 500 is shown. The system 500 may be used in a nacelle 501 having a fixed cascade array 502. The fixed cascade array 502 may remain stationary in response to translation of a translating sleeve 505. The fixed cascade array 502 may further include an aft cascade ring 504.

Figure 4:
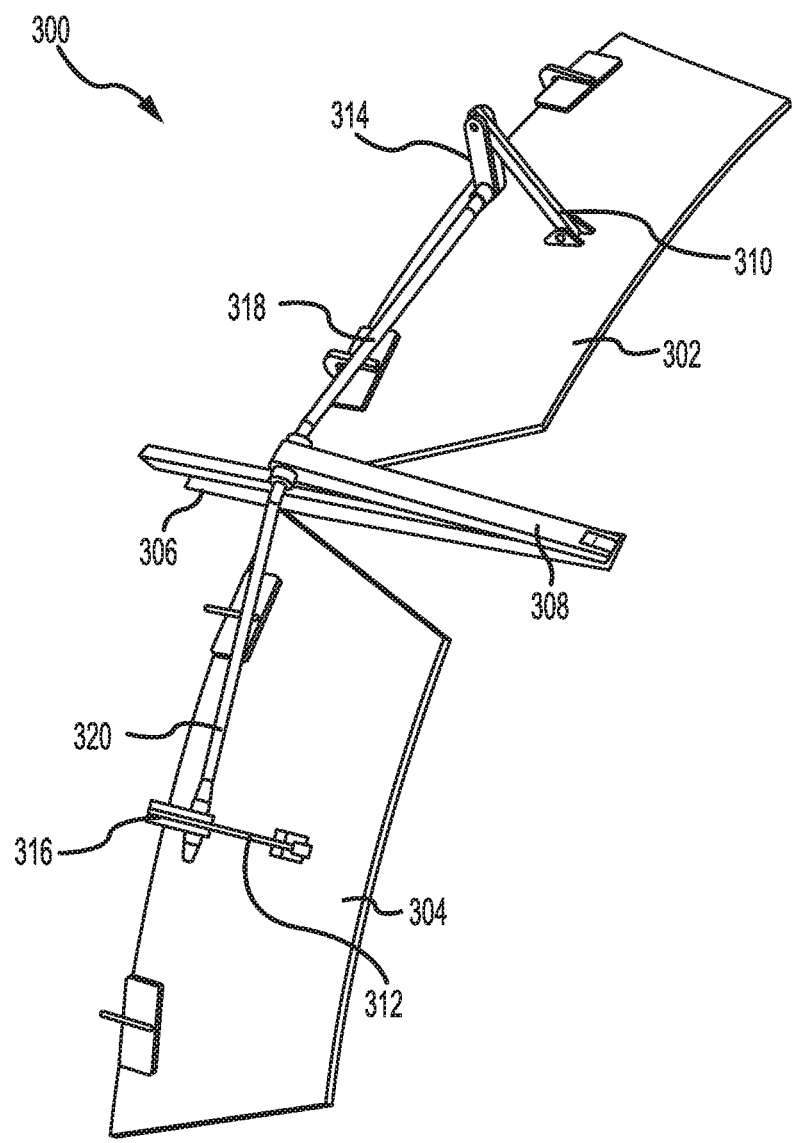
FIG. 4 illustrates a system for deploying blocker doors in accordance with various embodiments.

The system 500 may be similar to the system 300 of FIG. 4 and may include a fixed structure 506. The fixed structure 506 may remain stationary in response to translation of the translating sleeve 505.

The system 500 may further include a master link 508 pivotally coupled to the fixed structure 506. The system 500 may further include a master crank 510 located on an opposite end of the master link 508 from the fixed structure 506 and pivotally coupled to the master link 508. An opposite end of the master crank 510 from the master link 508 may be pivotally coupled to the translating sleeve 505. A blocker door 518 may further be pivotally coupled to the translating sleeve 505 via a hinge 520. A door crank 512 may also be pivotally coupled to the translating sleeve 505, and an opposite end of the door crank 512 may be coupled to a door link 514. An opposite end of the door link 514 from the door crank 512 may be coupled to the blocker door 518. The blocker door 518 may deploy in a similar manner as the blocker doors 302, 304 of FIG. 4.

Each of the master link 508, the master crank 510, the blocker door 518, the door crank 512, and the door link 514 may avoid contact with the aft cascade ring 504 during translation of the translating sleeve 505 and corresponding deployment and stowing of the blocker door 518.

Figure 9:
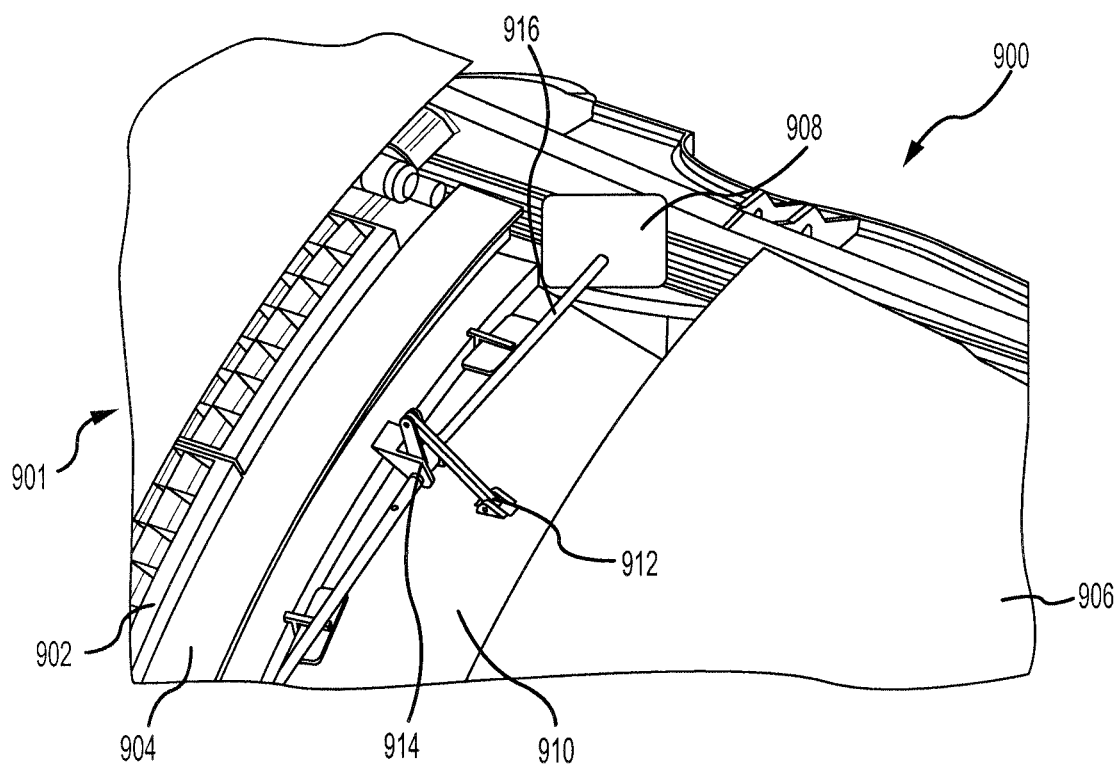
FIG. 9 illustrates a system for deploying blocker doors including a gear box to convert linear motion of a translating sleeve to rotational motion for deploying the blocker doors in accordance with various embodiments.

Turning now to FIG. 9, another system 900 for deployment of a blocker door 910 is shown. The system 900 may be included in a nacelle 901 having a cascade array 902, a fixed structure 904, and a translating sleeve 906.

The system 900 may further include a gear box 908 with a gear that converts linear motion of the translating sleeve 906 into rotational motion. The gear box 908 may include any gear or combination of gears that converts the linear motion into rotational motion, such as a slider crank mechanism, a cam mechanism, or the like. The system 900 may further include the blocker door 910 that is designed to deploy into a bypass air duct of the nacelle 901.

The system 900 may further include a door link 912 having a first end pivotally coupled to the blocker door 910, and a second end pivotally coupled to a door crank 914. The system 900 may further include the door crank 914 pivotally coupled to the door link 912, and a driveshaft 916 coupled to the gear box 908 and the door crank 914.

Aft translation of the translating sleeve 906 generates rotation by the gear box 908, which rotates the driveshaft 916. Rotation of the driveshaft 916 is transferred through the door crank 914 and the door link 912, rotating the blocker door 910 into a bypass air duct and thus causing the bypass air to flow through the cascade array 902.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for deploying a blocker door of a nacelle, comprising:
   a master link configured to be coupled to a fixed structure of the nacelle;
   a master crank pivotally attached to the master link;
   a first door crank;
   a first door link pivotally coupled to the first door crank;
   a first blocker door coupled to the first door link; and
   a first driveshaft coupled to the master crank and to the first door crank and configured to transfer motion from the master crank to the first door crank such that translation of a translating sleeve of the nacelle in an aft direction drives the master crank via the master link, which in turn drives the first door link via the first driveshaft and the first door crank to move the first blocker door into a bypass air duct defined by the nacelle.

2. The system of claim 1, wherein the master crank and the first door crank are each configured to be pivotally coupled to the translating sleeve.

3. The system of claim 1, further comprising:
   a second door crank;
   a second door link pivotally coupled to the second door crank;
   a second blocker door coupled to the second door link; and
   a second driveshaft coupled to the master crank and to the second door crank and configured to transfer motion from the master crank to the second door crank,
   wherein the second door crank and the second blocker door are each pivotally coupled to the translating sleeve.

4. The system of claim 3, wherein the master crank is located circumferentially between the first driveshaft and the second driveshaft.

5. The system of claim 1, wherein the master link, the master crank, the first door crank, and the first door link are each configured to be located radially outward from the bypass air duct in response to the translating sleeve being located at its forward-most position.

6. The system of claim 1, wherein the master link, the master crank, the first door crank, and the first door link are each configured to avoid contact with an aft cascade ring of a fixed cascade in response to aft and forward motion of the translating sleeve.

7. The system of claim 1, wherein the master link is pivotally attached to the fixed structure of the nacelle.

8. The system of claim 1, further comprising a first hinge coupled to the first blocker door and configured to be coupled to the translating sleeve such that the first blocker door can pivot radially inward relative to the translating sleeve.

9. The system of claim 1, wherein the nacelle includes a translating cascade.

10. A system for deploying a blocker door of a nacelle comprising:
    a master link configured to be coupled to a fixed structure of the nacelle;

a master crank pivotally attached to the master link;
a first door crank and a second door crank;
a first door link pivotally coupled to the first door crank and a second door link pivotally coupled to the second door crank;
a first blocker door coupled to the first door link and a second blocker door coupled to the second door link; and
a first driveshaft coupled to the master crank and to the first door crank and a second driveshaft coupled to the master crank and to the second door crank, the first driveshaft and the second driveshaft being configured to transfer motion from the master crank to the first door crank and the second door crank, respectively, such that translation of a translating sleeve of the nacelle in an aft direction drives the master crank via the master link, which in turn drives the first door link via the first driveshaft and the first door crank and drives the second door link via the second driveshaft and the second door crank to move the first blocker door and the second blocker door into a bypass air duct defined by the nacelle.

11. The system of claim 10, wherein the first blocker door, the second blocker door, the master crank, the first door crank, and the second door crank are each configured to be pivotally coupled to the translating sleeve.

12. The system of claim 10, wherein the master crank is located circumferentially between the first driveshaft and the second driveshaft.

13. The system of claim 10, wherein the master link, the master crank, the first door crank, the first door link, the second door crank, and the second door link are each configured to be located radially outward from the bypass air duct in response to the translating sleeve being located at its forward-most position.

14. The system of claim 10, wherein the master link, the master crank, the first door crank, the first door link, the second door crank, and the second door link are each configured to avoid contact with an aft cascade ring of a fixed cascade in response to aft and forward motion of the translating sleeve.

15. The system of claim 10, wherein the master link is pivotally attached to the fixed structure of the nacelle.

16. The system of claim 10, further comprising a first hinge coupled to the first blocker door and configured to be coupled to the translating sleeve such that the first blocker door can pivot radially inward relative to the translating sleeve.

17. The system of claim 10, wherein the nacelle includes a translating cascade.

* * * * *